United States Patent [19]

Kanai

[11] Patent Number: 5,896,252
[45] Date of Patent: Apr. 20, 1999

[54] MULTILAYER SPIN VALVE MAGNETO-RESISTIVE EFFECT MAGNETIC HEAD WITH FREE MAGNETIC LAYER INCLUDING TWO SUBLAYERS AND MAGNETIC DISK DRIVE INCLUDING SAME

[75] Inventor: Hitoshi Kanai, Kanagawa, Japan

[73] Assignee: Fujitsu Limited, Kawasaki, Japan

[21] Appl. No.: 08/850,796

[22] Filed: May 2, 1997

Related U.S. Application Data

[63] Continuation-in-part of application No. 08/649,125, May 14, 1996, abandoned.

[30] Foreign Application Priority Data

Aug. 11, 1995 [JP] Japan ................................. 7-205601

[51] Int. Cl.$^6$ ........................................................ G11B 5/39
[52] U.S. Cl. ................................................................ 360/113
[58] Field of Search ............................ 360/113; 324/252; 338/32 R

[56] References Cited

U.S. PATENT DOCUMENTS

| | | | |
|---|---|---|---|
| 5,159,513 | 10/1992 | Dieny et al. | 360/113 |
| 5,206,590 | 4/1993 | Dieny et al. | 360/113 |
| 5,287,238 | 2/1994 | Baumgart et al. | 360/113 |
| 5,341,261 | 8/1994 | Dieny et al. | 360/113 |
| 5,408,377 | 4/1995 | Gurney et al. | 360/113 |
| 5,422,571 | 6/1995 | Gurney et al. | 360/113 |
| 5,462,795 | 10/1995 | Shinjo et al. | 324/252 |
| 5,549,978 | 8/1996 | Iwasaki et al. | 360/113 |
| 5,648,885 | 7/1997 | Nishioka et al. | 360/113 |
| 5,652,054 | 7/1997 | Kikitsu et al. | 360/113 |

FOREIGN PATENT DOCUMENTS

| | | |
|---|---|---|
| 598581A2 | 5/1994 | European Pat. Off. . |
| 598581A3 | 5/1994 | European Pat. Off. . |
| 0687917 A2 | 12/1995 | European Pat. Off. . |
| 0694788 A2 | 1/1996 | European Pat. Off. . |

OTHER PUBLICATIONS

IEEE Transactions on Magnetic , vol. 30, No. 6, Nov. 1994, USA, pages 3819–3821, XP000601749—Anthony, T.C. et al.: "Magnetoresistance of symmetric spin valve structures".

*Primary Examiner*—Craig A. Renner
*Attorney, Agent, or Firm*—Greer, Burns & Crain, Ltd.

[57] ABSTRACT

A spin valve magnetoresistive effect magnetic head has a free magnetic layer having two sublayers composed of a CoFe sublayer and an NiFe sublayer. Alternatively, the two sublayers may be composed of a CoFe layer and an NiFe based alloy layer. The magnetic head further includes a nonmagnetic layer stacked on the CoFe layer, a pinned magnetic layer stacked on the nonmagnetic layer and an antiferromagnetic layer for fixing a magnetization direction of the pinned magnetic layer according to an exchange coupling between the pinned magnetic layer and the antiferromagnetic layer.

17 Claims, 7 Drawing Sheets

Ta 50 Å /NiFe20 Å /CoFe55 Å /Cu 25 Å /CoFe25 Å /FeMn150 Å

NiFe(75-xÅ)/CoFe(xÅ)/Cu25Å/CoFe25Å/FeMn100Å

MULTILAYER SPIN VALVE MAGNETO-RESISTIVE EFFECT MAGNETIC HEAD WITH FREE MAGNETIC LAYER INCLUDING TWO SUBLAYERS AND MAGNETIC DISK DRIVE INCLUDING SAME

This application is a continuation-in-part of application application, Ser. No. 08/ 649,125 filed on May. 14, 1996, now abandoned.

BACKGROUND OF THE INVENTION

1. Field of the Invention

The present invention relates generally to a spin valve magnetoresistive effect magnetic head and a magnetic disk drive and, more particularly, to a spin valve magnetoresistive effect magnetic head, in which a change of a signal magnetic field read from a magnetic medium is converted into a change rate of an electric resistance according to a spin valve magnetoresistive effect, and a magnetic disk drive with the spin valve magnetoresistive effect magnetic head.

2. Description of the Prior Art

In a magnetic sensor or a magnetic head, a magnetoresistive effect device made of NiFe is used as magnetic material. Because of the requirement of a higher sensitivity for the magnetic sensor and the magnetic head, a giant magnetoresistive (GMR) film has drawn attention to obtain a reading signal having a high intensity. A spin valve magnetoresistive effect film serving as a type of GMR film has particularly drawn attention because the film can be relatively easily produced and a change rate of an electric resistance in the film placed in a low magnetic field is larger than that in a normal magnetoresistive (MR) device.

A magnetoresistive effect magnetic head operated according to a spin valve magnetoresistive effect has been disclosed in U.S. Pat. No. 5,206,590, U.S. Pat. No. 5,159,513, etc.

An example of a conventional magnetoresistive effect magnetic head is shown in FIG. 1A, and a cross-sectional view of the conventional magnetoresistive effect magnetic head is shown in FIG. 1B.

As shown in FIGS. 1A and 1B, an $Al_2O_3TiC$ substrate 1, an alumina layer 2, a under layer 3 made of tantalum (Ta), a free (or unpinned) magnetic layer 4 composed of an NiFe layer 4a and a Co layer 4b, a nonmagnetic metal layer 5 made of Cu, a pinned magnetic layer 6 made of Co and an antiferromagnetic layer 7 made of FeMn are arranged in a film thickness direction in that order to manufacture a spin valve MR device. In this case, the film thickness direction is expressed in a Z direction.

The layers of a multilayered structure ranging from the under layer 3 to the antiferromagnetic layer 7 are respectively patterned in a planar rectangular shape, and a pair of electrode terminals 8 made of Au are arranged in a pair of regions placed at both edges of the antiferromagnetic layer 7 which is formed as an uppermost layer of the multilayered structure. A region of the multilayered structure placed between the electrode terminals 8 functions as a signal detecting region (or a sensing region) S. A shorter side of the rectangularly shaped pattern is directed in an X direction, and a longer side of the rectangularly shaped pattern is directed in a Y direction.

In the pinned magnetic layer 6, an exchange coupling magnetic field Hua is generated in an easily magnetization axis direction (X direction) because of an exchange coupling between the pinned magnetic layer 6 and the antiferromagnetic layer 7. Therefore, the pinned magnetic layer 6 is fixedly magnetized in the X direction, so that a magnetization direction of the layer 6 is not changed by an external signal magnetic field Hsig directed in the X direction.

A free magnetic layer denotes a magnetic layer in which a direction of the magnetization M is easily changed by the signal magnetic field Hsig, and a pinned magnetic layer denotes a magnetic layer in which a direction of the magnetization M is not easily changed by the external signal magnetic field Hsig as compared with the magnetization of the free magnetic layer.

The reason that the free magnetic layer 4 is composed of two layers represented by the NiFe layer 4a and the Co layer 4b is as follows.

First, an output of a magnetoresistive effect obtained in the free magnetic layer 4 is two or more times as high as that obtained in a free or unpinned magnetic layer made of only NiFe. Second, the Co layer 4b functions as a buffer layer to prevent an interfacial diffusion of Co and NiFe between the nonmagnetic metal layer 5 and the NiFe layer 4a caused when the layers 4a and 5 are heated.

The Co layer 4b itself is a semi-hard magnetic film. However, a two-layer structure 4a, 4b of NiFe and Co magnetically softens the layer 4 because of an exchange coupling between the NiFe layer 4a and the Co layer 4b. Therefore, the two-layer structure makes the layer 4 function as a free or unpinned magnetic layer.

The magnetization M of the free magnetic layer 4 having the two-layer structure coincides with the direction which intersects orthogonally with the magnetization direction of the pinned magnetic layer 6 (i.e., Y direction or easily magnetization axis direction) if a strength of the signal magnetic field Hsig is made to be zero. The direction of the magnetization M in the free magnetic layer 4 changes in accordance with the signal magnetic field Hsig.

A total electric resistance of the multilayered structure ranging from the under layer 3 to the antiferromagnetic layer 7 changes in proportion to a cosine of an angle $\theta(\cos \theta)$ between the magnetization direction of the pinned magnetic layer 6 and the magnetization direction of the free magnetic layer 4. A constant current passes through the signal detecting region (or the sensing region) S placed in the multilayered structure from one electrode terminal 6 to the other electrode terminal 8. When the total electric resistance is changed, a voltage difference between the electrode terminals 8 changes. The change of the total electric resistance is calculated according to the Ohm's law by detecting the change of the voltage difference.

The reason that the magnetization direction of the pinned magnetic layer 6 and the magnetization direction of the free magnetic layer 4 are perpendicular to each other is to make the total electric resistance linearly change with respect to the signal magnetic field Hsig.

To prevent the interfacial diffusion of Co and NiFe between the nonmagnetic metal layer 5 and the NiFe layer 4a caused by heating the layers 4a and 5, it is required that the thickness of the Co layer 4b is set to 30 Å (angstroms) or more.

The inventor has experimentally examined the relationship between an external magnetic field and a change rate of electric resistance in the spin valve MR device in which the film thickness of the Co layer 4b composing the free magnetic layer 4 is set to 30 Å or more.

A first sample used for an experiment has the same layer configuration as that of the spin valve MR device shown in FIGS. 1A and 1B. That is, a film thickness of the under layer 3 made of Ta is 50 Å, a film thickness of the NiFe layer 4a is 20 Å, a film thickness of the Co layer 4b is 55 Å, a film thickness of the nonmagnetic metal layer 5 made of Cu is 32 Å, a film thickness of the pinned magnetic layer 6 made of Co is 55 Å, and a film thickness of the antiferromagnetic layer 7 made of FeMn is 150 Å.

As a result of the experiment, magnetoresistive effect characteristics (ΔMR) shown in FIG. 2 are obtained. This MR effect characteristics are obtained by continuously increasing and decreasing the strength of an external magnetic field in a range from −200 oersteds (Oe) to 200 oersteds (Oe). As shown in FIG. 2, it is realized that a strength difference in the external magnetic field between leading and trailing edges of a characteristic curve placed in the neighborhood of a specific point at which the strength of the external magnetic field is zero is about 40 oersteds (Oe). Because the strength difference is equivalent to a value twice as high as a coercive force Hc of the spin valve MR device, the coercive force Hc of the first sample is no less than 20 oersteds (Oe), and the sensitivity of the spin valve MR device for the signal magnetic field Hsig is degraded.

The reason that the coercive force Hc is increased to 20 oersteds (Oe) is because the free magnetic layer 4 has the Co layer (55 Å) 4b with a thick film. Therefore, the inventors have tried to decrease the coercive force Hc of the spin valve MR device by thinning the Co layer 4b.

A second sample used for the experiment has the same layer configuration as that of the spin valve MR device shown in FIGS. 1A and 1B. That is, a film thickness of the under layer 3 made of Ta is 50 Å, a film thickness of the NiFe layer 4a is 55 Å, a film thickness of the Co layer 4b is 20 Å, a film thickness of the nonmagnetic metal layer 5 made of Cu is 26 Å, a film thickness of the pinned magnetic layer 6 made of Co is 55 Å, and a film thickness of the antiferromagnetic layer 7 made of FeMn is 150 Å.

As a result of the experiment, the MR effect characteristics shown in FIG. 3 have been obtained, and the coercive force Hc of the spin valve MR device has been decreased to 6 oersteds (Oe), and a change rate ΔMR of an electric resistance in the spin valve MR device has been increased as compared with that shown in FIG. 2.

However, if the Co layer 4b is thinned to less than 20 Å, the interfacial diffusion is caused between the nonmagnetic metal layer 5 and the free magnetic layer 4 when they are subjected to heating, and it is likely to cause such a drawback that soft magnetic property of the free magnetic layer 4 is degraded.

SUMMARY OF THE INVENTION

An object of the present invention is to provide a spin valve magnetoresistive effect magnetic head, in which an interfacial diffusion of materials between a nonmagnetic metal layer and a free or unpinned magnetic layer caused by heating the layers is prevented and a reading signal having a high intensity is output, and a magnetic recording apparatus with the magnetic head.

The spin valve magnetoresistive effect magnetic head according to the present invention has a free (or unpinned) magnetic layer manufactured in a two-layer structure composed of a CoFe layer and an NiFe layer or another two-layer structure composed of a CoFe layer and an NiFe based alloy layer.

Even though a film thickness of the CoFe layer is equal to or more than 20 Å, the free magnetic layer manufactured in the two-layer structure has a soft magnetic property. In addition, it has been experimentally ascertained that the free magnetic layer having the CoFe layer lessens a coercive force of the spin valve magnetoresistive effect device. In this case, to lessen the coercive force, it is preferrable that a film thickness of the NiFe layer be set to 10 Å or more, a composition ratio of Co in the CoFe layer be set to 90 wt % and a composition ratio of Fe in the CoFe layer be set to 10 wt %.

Because the film thickness of the CoFe layer is equal to or more than 10 Å (preferably, more than 20 Å), an interfacial diffusion of materials between a nonmagnetic metal layer and the free magnetic layer caused by heating the layers can be reliably prevented, and a soft magnetic property of the free magnetic layer can be maintained.

Also, it has been experimentally ascertained that a change rate of an electric resistance of the magnetic head changing with the strength of a magnetic field is increased by adopting the free magnetic layer manufactured in the two-layer structure having the CoFe layer.

In the event that the NiFe based alloy layer is made of NiFeCr, NiFeNb or NiFeRh, noise caused according to an anisotropic magnetoresistive (MR) effect can be reduced. Furthermore, because a specific resistance of NiFeCr, NiFeNb or NiFeRh is higher than that of NiFe, a current utilizing efficiency in the magnetic head can be heightened, and a reading signal having a high intensity can be output.

Also, in cases where a pinned magnetic layer is made of the same constitutional material as that of the CoFe layer of the free magnetic layer, a volume of target material consumed for forming each of the layers in a sputtering operation can be reduced.

DESCRIPTION OF THE PREFERRED EMBODIMENTS

A configuration of a spin valve magnetoresistive effect magnetic head according to preferred embodiments of the present invention will be described with reference to FIGS. 4A and 4B hereinafter.

Figure 4A:
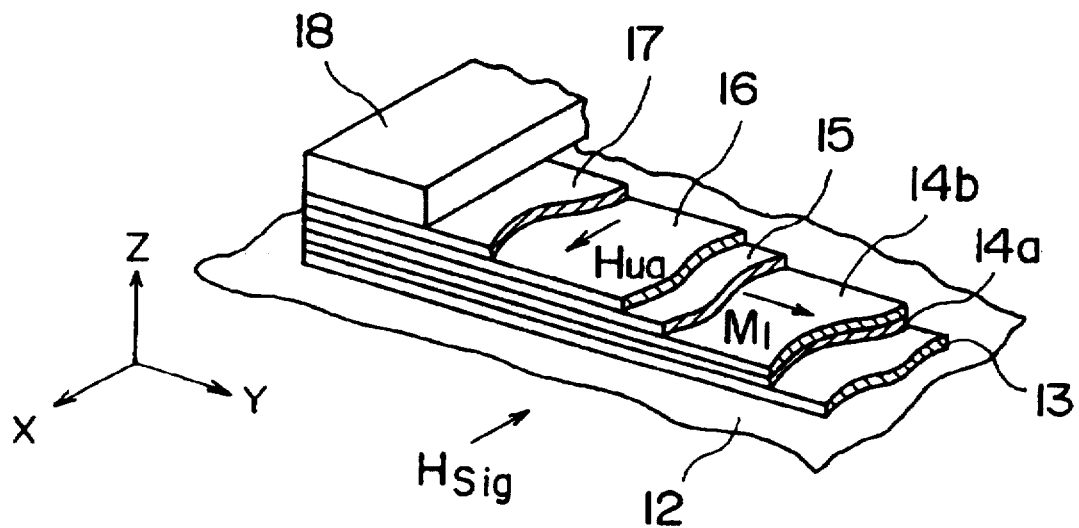
FIG. 4A is a diagonal view of a part of a spin valve magnetoresistive effect magnetic head according to an embodiment of the present invention.
Figure 4B:
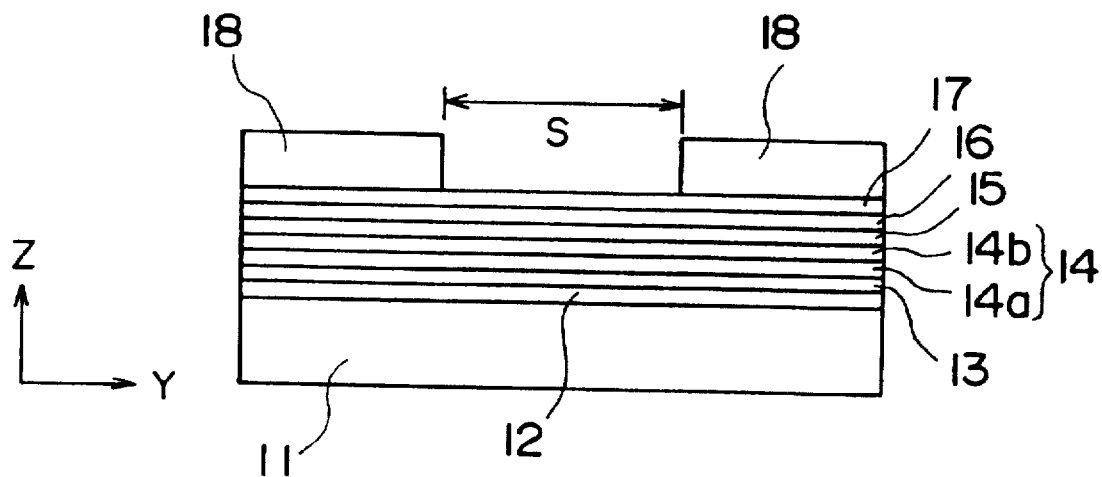
FIG. 4B is a cross-sectional view of the spin valve magnetoresistive effect magnetic head shown in FIG. 4A.

As shown in FIGS. 4A and 4B, an under layer 13 made of tantalum (Ta), a free magnetic layer 14 manufactured in a two-layer structure of an NiFe layer 14a and a $Co_{90}Fe_{10}$ layer 14b, a nonmagnetic metal layer 15 made of Cu, a pinned magnetic layer 16 made of $Co_{90}Fe_{10}$, and an antiferromagnetic layer 17 made of FeMn are formed in that order on an alumina layer 12 formed on a substrate 11 made of $Al_2O_3TiC$ (AlTiC) or the like. In this case, the film stacking direction is expressed by a Z direction.

The layers ranging from the under layer 13 to the antiferromagnetic layer 17 in a multilayered structure are respectively patterned in a planar rectangular shape. A pair of electrode terminals (lead terminals) 18 made of Au are arranged in regions placed at both edges of the antiferromagnetic layer 17 which is formed as an uppermost layer of the multilayered structure. A region of the multilayered structure placed between two electrode terminals 18 functions as a signal detecting region (a sensing region) S. A shorter side of the rectangularly shaped pattern is directed in an X direction, and a longer side of the rectangularly shaped pattern is directed in a Y direction.

Respective elements constituting the spin valve magnetoresistive effect device will be described hereinafter.

The under layer 13 is made of Ta. Preferably, a film thickness is set in the range of 50 to 100 Å. In this embodiment, the film thickness is set to 50 Å.

The free magnetic layer 14 is made up of the NiFe layer 14a and the $Co_{90}Fe_{10}$ layer 14b. A film thickness of the NiFe layer 14a is preferably set in the range of 10 to 100 Å. In this embodiment, the film thickness is set to 20 Å. If the film thickness is in excess of 100 Å, a GMR output is reduced due to a current shunt effect so that the reduction in the output of the magnetic head occurs.

Similarly, it is preferable that a film thickness of the $Co_{90}Fe_{10}$ layer 14b is set in the range of 10 to 100 Å. In this embodiment, the film thickness is set to 55 Å. As described later in connection with FIG. 6A, it has been known that, if the film thickness is selected as about 25 Å, satisfactory results can be obtained, like the case where 55 Å is employed. A coercive force Hc of a CoFe magnetic body constituting the $Co_{90}Fe_{10}$ layer 14b can be minimized if a composition ratio of Co is set to 90 wt % and a composition ratio of Fe is set to 10 wt %, but a slight aberration in the composition ratio within several weight percentages is allowable. In addition, the film thickness of the NiFe layer 14a must be set to more than 10 Å for the purpose of decreasing the coercive force Hc of the spin valve magnetoresistive effect device. Similarly, as described later with reference to FIG. 6A, if the film thickness is reduced beyond a lower limit value of 10 Å, the coercive force Hc is increased. However, if the film thickness exceeds 100 Å, the GMR output is reduced due to a current shunt effect, which results in a reduction in the output of the magnetic head.

The nonmagnetic metal layer 15 is made of Cu and it is preferable that its film thickness is set in the range of 20 to 40 Å. In this embodiment, the film thickness is set to 26 Å. If a solid solubility between Ni and Cu is 100, respective solid solubilities of Fe and Co constituting the $Co_{90}Fe_{10}$ layer 14b are very small such as 4 to 5. Therefore, an interfacial diffusion of CoFe and Cu between the $Co_{90}Fe_{10}$ layer 14b and the nonmagnetic metal layer 15 made of Cu does not occur. As a result, a soft magnetic property of the free magnetic layer 14 can be preferably maintained.

The pinned magnetic layer 16 is made of the same material as the $Co_{90}Fe_{10}$ layer 14b of the free magnetic layer 14. It is preferable that its film thickness is set in the range of 10 to 50 Å. In this embodiment, the film thickness is set to 25 Å. As described later in connection with FIG. 7, if the film thickness is made thinner than a lower limit value of 10 Å, reduction in the GMR output ($\rho\Delta$) occurs.

The antiferromagnetic layer 17 is made of FeMn and it is preferable that its film thickness is set in the range of 100 to 150 Å.

An operation of such spin valve magnetoresistive effect device will be explained hereinafter. In the pinned magnetic layer 16, an exchange-coupling magnetic field Hua is generated in an easily magnetization axis direction along the X direction because of an exchange coupling between the pinned magnetic layer 16 and the antiferromagnetic layer 17. Therefore, a magnetization direction of the pinned magnetic layer 16 is fixed in the X direction, so that a magnetized direction of the pinned magnetic layer 16 is not changed by a signal magnetic field Hsig an intensity of which is changed in the X direction.

A magnetization M1 of the free magnetic layer 14 having the two-layer structure is directed in the Y direction (or an easily magnetization axis direction) perpendicular to the magnetization direction (or the X direction) of the pinned magnetic layer 16 in cases where a strength of the signal magnetic field Hsig is zero. The direction of the magnetization M1 in the free magnetic layer 14 changes when a magnetization component of the signal magnetic field Hsig directed in the X direction is applied to the spin valve magnetoresistive effect device.

A total electric resistance of the multilayered structure ranging from the under layer 13 to the antiferromagnetic layer 17 changes in proportion to a cosine of an angle $\theta(\cos \theta)$ between the magnetization direction of the pinned magnetic layer 16 and the magnetization direction of the free magnetic layer 14. A constant current passes through the signal detecting region (or the sensing region) S placed in the multilayered structure from one electrode terminal 18 to the other electrode terminal 18. When the total electric resistance changes, a voltage difference between the electrode terminals 18 changes. The change of the total electric resistance is calculated according to Ohm's law by detecting the change of the voltage difference.

The spin valve magnetoresistive effect device having the above configuration can attain the following advantages. The free magnetic layer 14 is composed of two layers of the NiFe layer 14a and the $Co_{90}Fe_{10}$ layer 14b. The free magnetic layer 14 shows a soft magnetic property because of an exchange coupling of the NiFe layer 14a and the $Co_{90}Fe_{10}$ layer 14b. At the same time, the $Co_{90}Fe_{10}$ layer 14b has a function to prevent an interfacial diffusion of NiFe and Cu between the NiFe layer 14a and the nonmagnetic metal layer 15 caused when they are subjected to heating.

Next, magnetoresistive (MR) characteristics in the spin valve magnetoresistive effect device having the above structure will be described with reference to FIG. 5.

Figure 5:
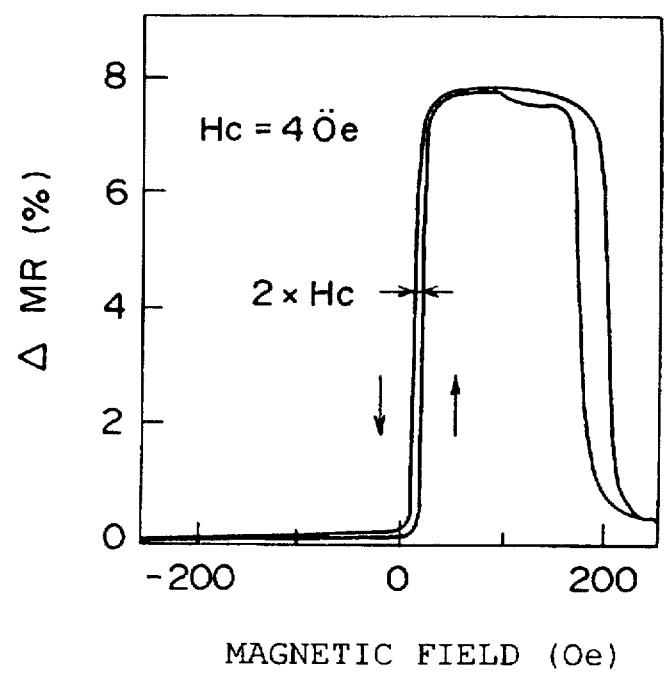
FIG. 5 is a characteristic view showing the relationship between the change of a magnetic field strength and a change rate of an electric resistance in the spin valve magnetoresistive effect magnetic head shown in FIG. 4A.

When MR characteristics (i.e. the relationship between the change of an external magnetic field strength and a change rate ΔMR of an electric resistance) in the spin valve magnetoresistive effect device having the structure of Ta 50 Å/NiFe 20 Å/CoFe 55 Å/Cu 25 Å/CoFe 25 Å/FeMn 150 Å, as shown in FIGS. 4A and 4B, are examined experimentally, the results shown in FIG. 5 have been obtained. These MR characteristics are the experimental results which have been derived by continuously increasing and decreasing the strength of an external magnetic field in the range from −200 oersteds (Oe) to 200 oersteds (Oe).

Figure 1A:
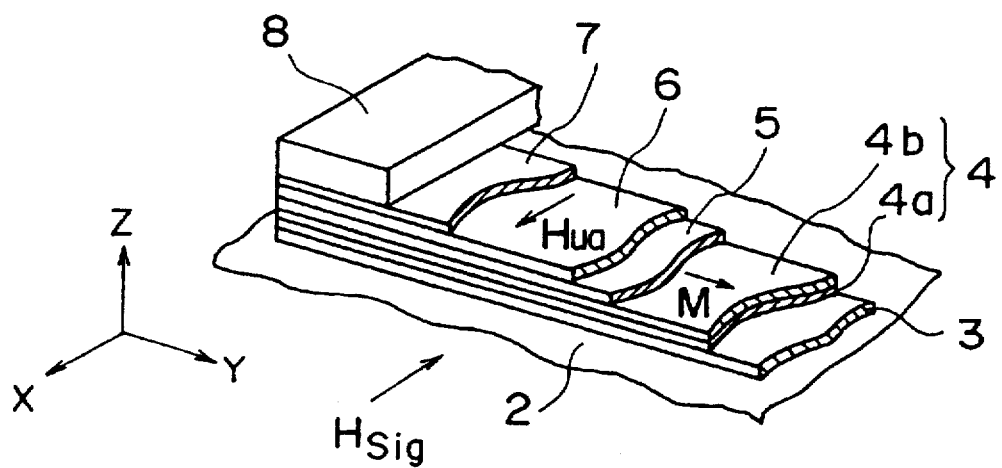
FIG. 1A is a diagonal view of a part of a conventional spin valve magnetoresistive effect magnetic head.
Figure 1B:
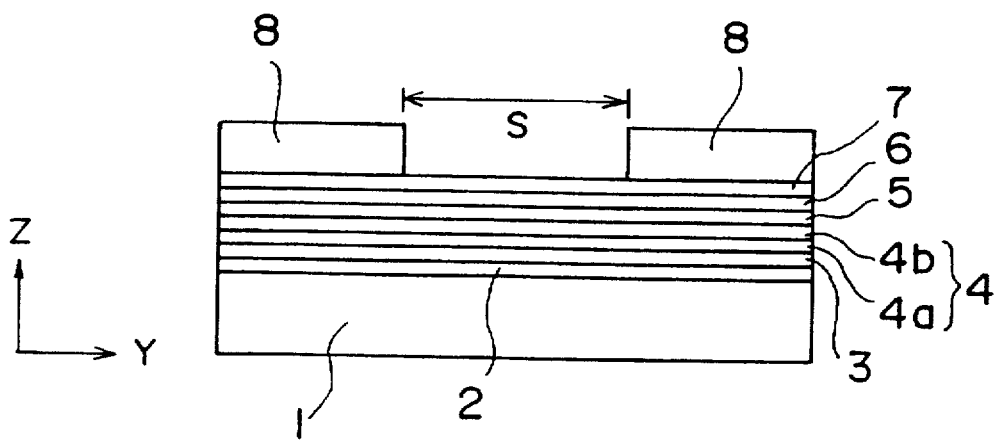
FIG. 1B is a cross-sectional view of the conventional spin valve magnetoresistive effect magnetic head shown in FIG. 1A.
Figure 2:
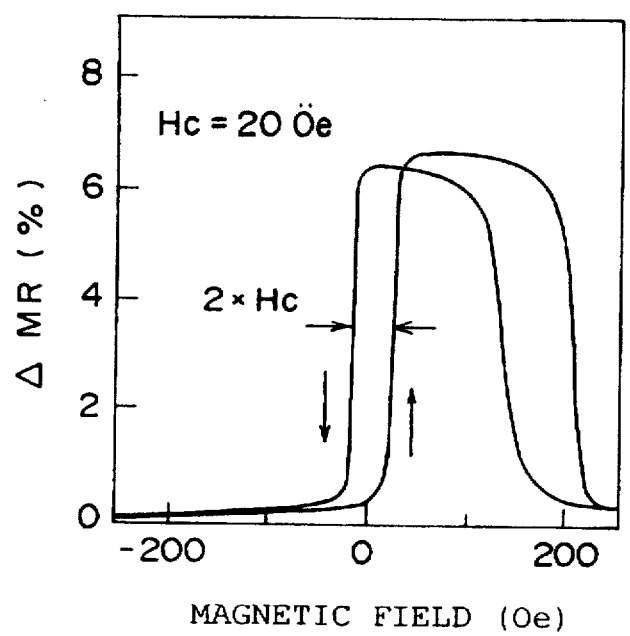
FIG. 2 is a characteristic view showing the relationship between the change of a magnetic field strength and a change rate of an electric resistance in the conventional spin valve magnetoresistive effect magnetic head in FIG. 1A.
Figure 3:
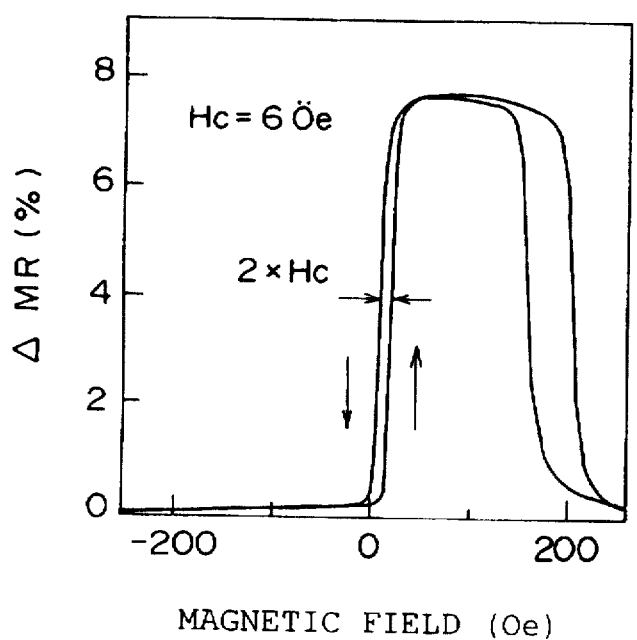
FIG. 3 is a characteristic view showing the relationship between the change of a magnetic field strength and a change rate of an electric resistance in the conventional spin valve magnetoresistive effect magnetic head in cases where a film thickness of a Co layer of a free magnetic layer is thinned.

As a result of the experiment, a coercive force Hc of the spin valve magnetoresistive effect device has been considerably decreased to 4 oersteds (Oe), which is substantially equal to that of NiFe. In addition, a change rate ΔMR of an electric resistance has become high as compared with that in the conventional magnetic head shown in FIG. 2, so that sensitivity for the signal magnetic field Hsig can be improved.

The reason that the coercive force Hc of the spin valve magnetoresistive effect device has been decreased is that the $Co_{90}Fe_{10}$ layer 14b is adopted as one layer in the two layered structure of the free magnetic layer 14. In addition, because the $Co_{90}Fe_{10}$ layer 14b is interposed between the NiFe layer 14a and the nonmagnetic layer 16 made of Cu, the interfacial diffusion of NiFe and Cu between the NiFe layer 14a and the nonmagnetic metal layer 16 caused when the layers 14 and 16 are heated can be prevented by the $Co_{90}Fe_{10}$ layer 14b.

Subsequently, when a characteristic of the GMR output Δρ are examined if respective film thicknesses of the NiFe layer 14a and the CoFe layer 14b constituting the free magnetic layer 14 are changed, the result shown in FIG. 6A has been obtained. This characteristic of the GMR output shows the experimental result which has been obtained under the assumption that a total film thickness of the free magnetic layer 14 is set to 75 Å, wherein a film thickness of the NiFe layer 14a is changed within the range of 0 to 75 Å, and then a film thickness of the CoFe layer 14b is changed within the range of 15 to 0 Å corresponding to the NiFe layer 14a. It can be understood from these results that, if a film thickness of the CoFe layer 14b is less than 10 Å or less, the GMR output Δρ is remarkably decreased. If the MR characteristics of the GMR output characteristics at a point b (i.e., a point where the NiFe layer 14a is 20 Å and the CoFe layer is 55 Å) which is similar to the configuration of the spin valve magnetoresistive effect device shown in FIG. 4, the results have been achieved wherein the coercive force Hc can be reduced to a very small value as shown in FIG. 6B. In addition, when the MR characteristics at a point c where the free magnetic layer 14 is made of a single layer of the CoFe layer 14b (i.e., the CoFe layer 14b is 75 Å) have been examined, the results have been achieved wherein the coercive force Hc can be extremely increased, as shown in FIG. 6C.

Figure 6A:
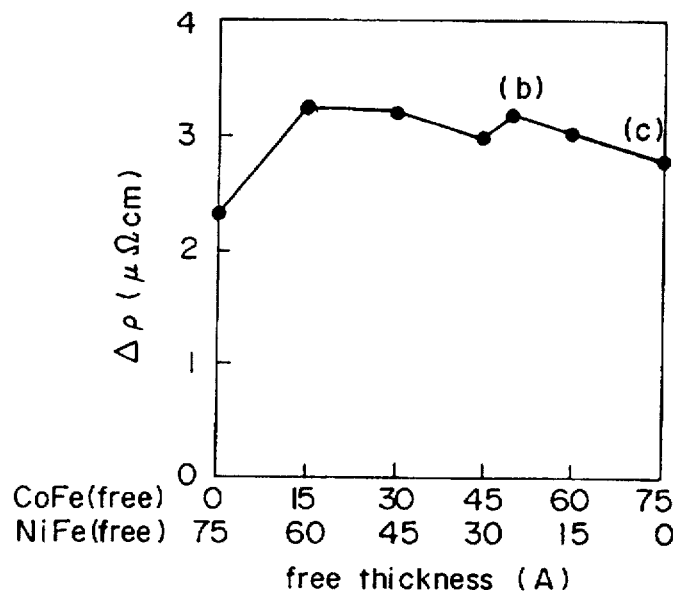
FIG. 6A is a characteristic view showing GMR output in the event that respective film thicknesses of an NiFe layer and a CoFe layer of a free magnetic layer are changed in the spin valve magnetoresistive effect magnetic head illustrated as an example of the embodiment of the present invention.
Figure 6B:
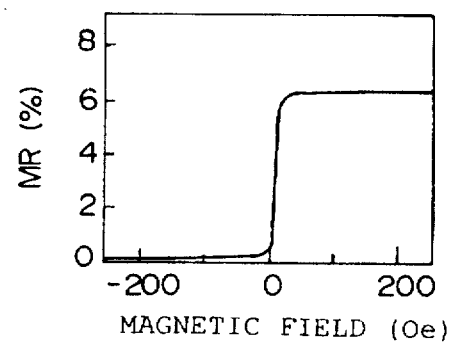
FIG. 6B is a characteristic view showing MR characteristics at a point b in FIG. 6A.
Figure 6C:
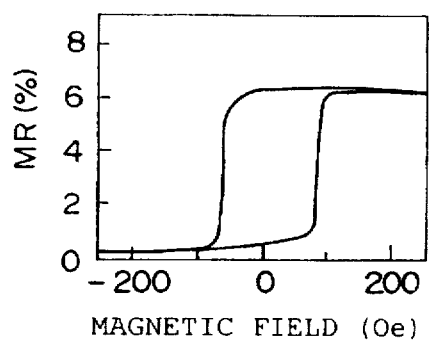
FIG. 6C is a characteristic view showing MR characteristics at a point c in FIG. 6A.

From the results shown in FIG. 6A, it would be understood that, although the film thickness of the NiFe layer 14a is 20 Å and the film thickness of the CoFe layer 14b is 55 Å in the configuration of the spin valve magnetoresistive effect device shown in FIG. 4, similar GMR outputs can be obtained in the vicinity where a film thickness of the NiFe layer 14a is 50 Å and a film thickness of the $Co_{90}Fe_{10}$ layer 14b is 25 Å.

Figure 7:
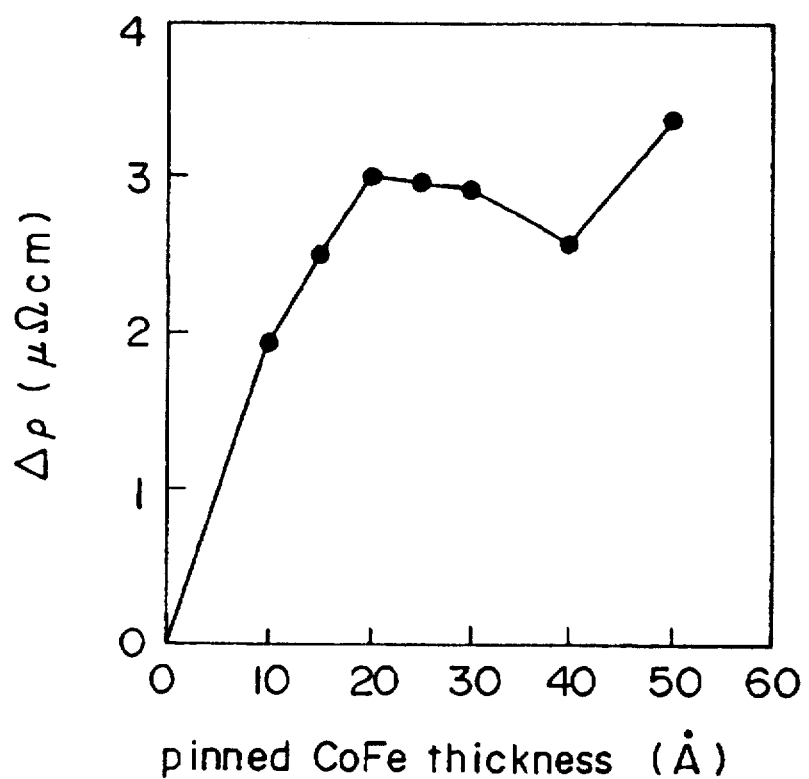
FIG. 7 is a characteristic view showing GMR output in the event that a film thickness of a pinned magnetic layer is changed in the spin valve magnetoresistive effect magnetic head illustrated as an example of the embodiment of the present invention.

FIG. 7 shows the GMR output characteristics of the spin valve magnetoresistive effect device when a film thickness of the pinned magnetic layer 16 is varied under the condition that a film thickness of the NiFe layer 14a is set to 50 Å and a film thickness of the $Co_{90}Fe_{10}$ layer 14b is 25 Å, as described above. The GMR output characteristics show the experimental results which have been obtained when a film thickness X Å of the pinned magnetic layer 16 made of CoFe is varied in the range of 0 to 50 Å, employing the spin valve magnetoresistive effect device having the structure of NiFe 25 Å/CoFe 50 Å/cu 25 Å/CoFe X Å/FeMn 100 Å. From this result, it can be understood that, if the film thickness of the pinned magnetic layer 16 made of CoFe is less than 10 Å, the GMR output (Δρ) is reduced immediately.

Then, a modification of the spin valve magnetoresistive effect device shown in FIGS. 4A and 4B will be explained. In the structure of the spin valve magnetoresistive effect device shown in FIGS. 4A and 4B, an NiFe based alloy obtained by adding other elements to NiFe such as NiFeCr, NiFeNb, NiFeRh may be used in place of the NiFe layer 14a of the two magnetic layers constituting the free magnetic layer 14. If any of these NiFe based alloys is used, its film thickness is set in the range of 10 to 100 Å, like the NiFe layer 14a. The CoFe layer 14b does not exhibit the soft magnetic property if its film thickness is set to be less than 10 Å, while the GMD output is reduced because of a current shunt effect to thereby reduce the output of the magnetic head if its film thickness is set to be more than 100 Å. Because the anisotropic magnetoresistive (AMR) effect causing noises in the spin valve magnetoresistive effect is considerably reduced by using the NiFe based alloy layer as compared with the reduction of the AMR effect in case of the use of the NiFe layer 14a, a signal-noise (S/N) ratio can be increased.

Also, there can be achieved such advantages that, because a specific resistance of the NiFe based alloy layer is higher than that of the NiFe layer 14a, a current utilizing efficiency in the spin valve magnetoresistive effect device can be further improved, and an output intensity of a reading signal can also be enhanced.

As described above, according to the present invention, the spin valve MR effect device 45 has the free magnetic layer 14 which is manufactured in a two layered structure composed of the NiFe layer 14a and the CoFe layer 14b or another two-layer structure composed of the NiFe based alloy layer and the CoFe layer 14b, and therefore the coercive force Hc of the spin valve magnetoresistive effect magnetic head can be made small because of the CoFe layer 14b.

In the case where the film thickness of the NiFe layer 14a is set to 10 Å or more, a composition ratio of Co in the CoFe layer 14b is set in a range from 95 to 85 wt % and a composition ratio of Fe in the CoFe layer 14b is set in the range from 5 to 15 wt %, the coercive force Hc of the spin valve magnetoresistive effect magnetic head is considerably reduced. In particular, if a composition ratio of Co in the CoFe layer 14b is set to 90 wt % and a composition ratio of Fe in the CoFe layer 14b is set to 10 wt %, the coercive force Hc can be minimized.

Also, in the case where the film thickness of the CoFe layer 14b is set to 10 Å or more (preferably, 20 Å or more), the interfacial diffusion of NiFe and Cu between the free magnetic layer 14 and the nonmagnetic metal layer 15 caused by heating the layers 14 and 15 can be reliably prevented by the $Co_{90}Fe_{\cdot10}$ layer 14b. As a result, the soft magnetic property of the free magnetic layer 14 can be preferably maintained.

Also, because the free magnetic layer 14 manufactured as the two-layer structure having the CoFe layer 14b is provided to the magnetic head, a change rate of an electric resistance of the magnetic head according to change in the strength of a magnetic field can be increased.

In the event that the NiFe based alloy layer is made of NiFeCr, NiFeNb or NiFeRh in the above modification, noises in the magnetic head due to the AMR effect can be reduced. In addition, because a specific resistance of NiFeCr, NiFeNb or NiFeRh is higher than that of NiFe, a current utilizing efficiency in the magnetic head can be heightened, and a reading signal having a high intensity can be output.

Next, a magnetic head of a magnetic recording apparatus, to which the spin valve magnetoresistive effect device according to the present invention is applied, and a magnetic recording medium will be described with reference to FIGS. 8A and B.

Figure 8A:
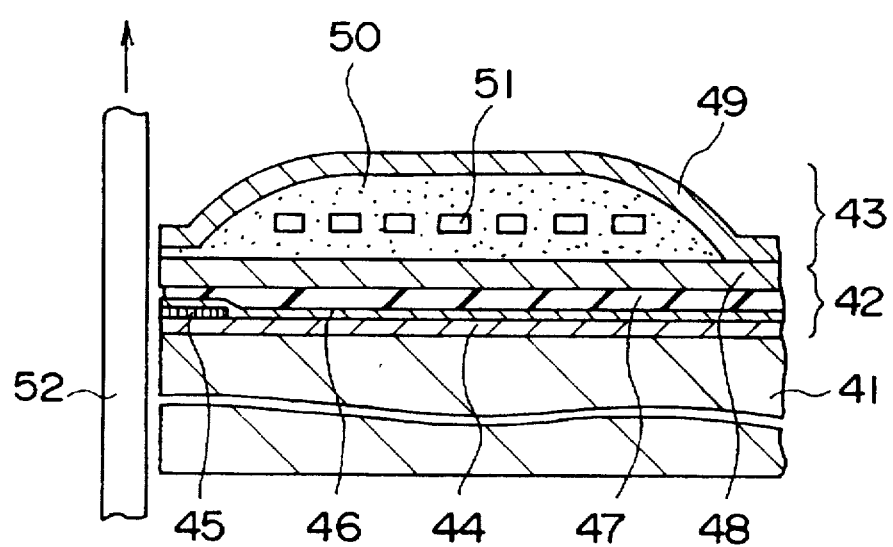
FIG. 8A is a cross-sectional view of the part of a magnetic recording apparatus with the spin valve magnetoresistive effect head shown in FIG. 4A.

In FIG. 8A, a reproducing head 42 and a recording head 43 are formed adjacently on a substrate 41. The reproducing head 42 comprises a spin valve MR effect device 45 formed on a first magnetic shielding layer 44 through an insulating film (not shown), an electrode terminal (leading terminal) 46 led from the spin valve MR effect device 45, an insulating film 47 for covering the spin valve MR effect device 45 and the electrode terminal 46, and a second magnetic shielding layer 48 formed on the insulating film 47. The configuration shown in FIGS. 4A and 4B is employed as the spin valve MR effect device 45. The spin valve MR effect device 45 may be employed, unlike FIG. 4B, which is made up by forming the antiferromagnetic layer 17, the pinned magnetic layer 16, the nonmagnetic metal layer 15 and the free magnetic layer 14 on the under layer 13 in that order.

The recording head 43 comprises a third magnetic shielding layer 49 placed on the second magnetic shielding layer 48, an insulating layer 50 packed in a space surrounded by the second and third magnetic shielding layers 48 and 49, and a coil 51 buried in the insulating layer 50.

The first, second and third magnetic shielding layers 44, 48 and 49 are formed of a soft magnetic body respectively, and a gap is formed in a space between a magnetic recording medium 52 and each of the first, second and third magnetic shielding layers 44, 48 and 49.

Figure 8B:
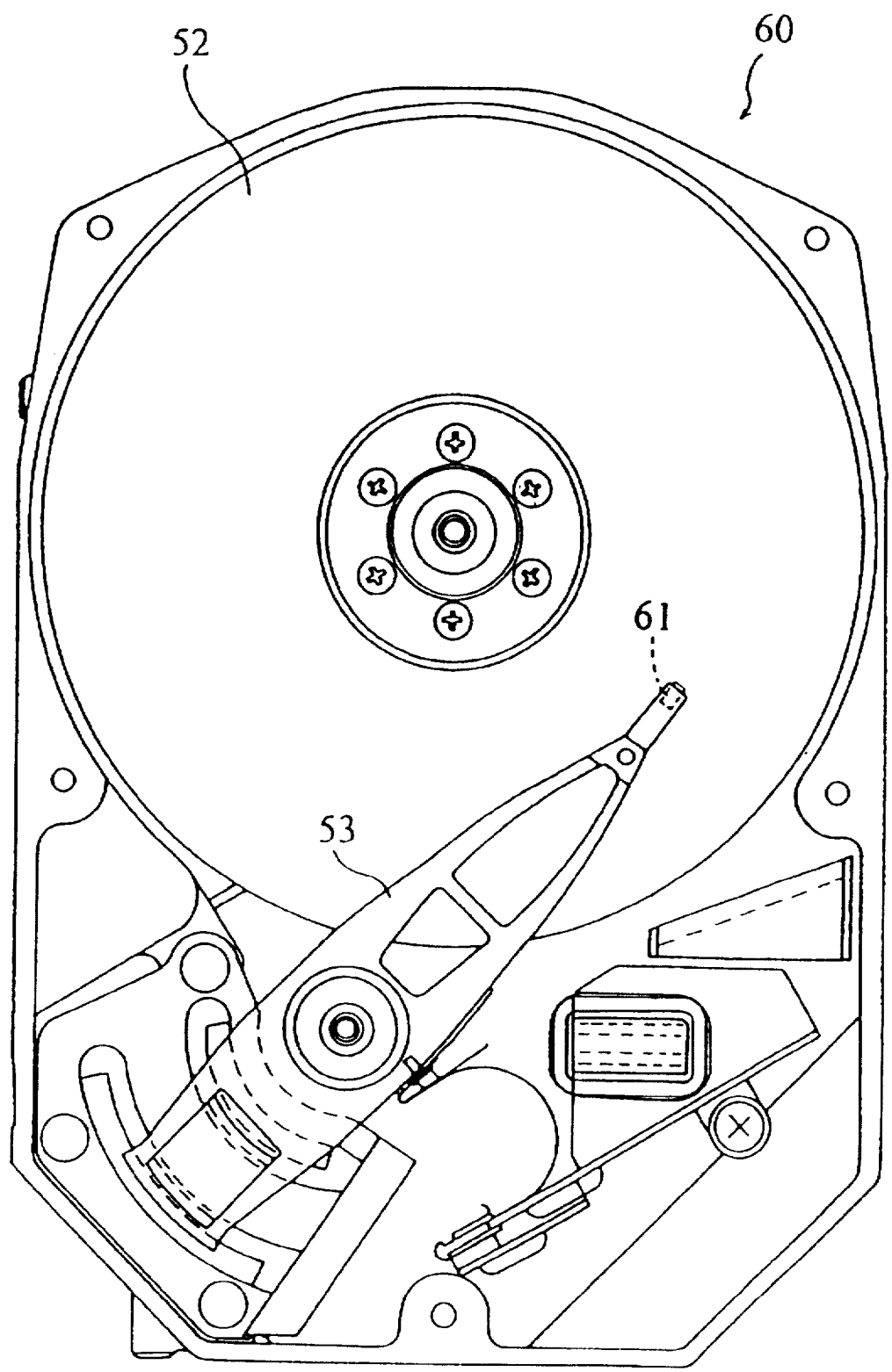
FIG. 8B is a plan view of a magnetic disk drive mainly composed of a slider having the MR head and a magnetic disk according to the present invention.

In FIG. 8B a magnetic disk drive 60 comprises the magnetic disk 52, and the slider 61 having the MR head, and a spring arm 53 supporting the slider 61.

What is claimed is:

1. A spin valve magnetoresistive effect magnetic head comprising:

a free magnetic layer consisting of a CoFe sublayer and an NiFe sublayer;

an underlying layer made of tantalum beneath and in direct physical contact with the free magnetic layer;

a nonmagnetic layer stacked on the CoFe sublayer;

a pinned magnetic layer stacked on the nonmagnetic layer;

an antiferromagnetic layer for fixing a magnetization direction of the pinned magnetic layer according to an exchange coupling between the pinned magnetic layer and the antiferromagnetic layer; and a pair of electrode terminals for passing a current through the free magnetic layer, the nonmagnetic layer, the pinned magnetic layer and the antiferromagnetic layer;

wherein a composition ratio of the CoFe sublayer is 95 to 85 wt % of Co and 5 to 15 wt % of Fe.

2. A spin valve magnetoresistive effect magnetic head according to claim 1, wherein a composition ratio of the CoFe sublayer is 90 wt % of Co and 10 wt % of Fe.

3. A spin valve magnetoresistive effect magnetic head according to claim 1, wherein a film thickness of the CoFe sublayer is in a range of 10 to 100 Å.

4. A spin valve magnetoresistive effect magnetic head according to claim 1, wherein a film thickness of the NiFe sublayer is in a range of 10 to 100 Å.

5. A spin valve magnetoresistive effect magnetic head according to claim 1, wherein the pinned magnetic layer is formed of CoFe.

6. A spin valve magnetoresistive effect magnetic head according to claim 1, wherein the nonmagnetic layer is formed of Cu.

7. A spin valve magnetoresistive effect magnetic head according to claim 1, wherein the underlying layer is directly below the free magnetic layer.

8. A spin valve magnetoresistive effect magnetic head comprising:

a free magnetic layer consisting of a CoFe sublayer and an NiFe based alloy sublayer;

an under layer made of tantalum beneath and in direct physical contact with the free magnetic layer;

a nonmagnetic layer stacked on the CoFe sublayer;

a pinned magnetic layer stacked on the nonmagnetic layer;

an antiferromagnetic layer for fixing a magnetization direction of the pinned magnetic layer according to an exchange coupling between the pinned magnetic layer and the antiferromagnetic layer; and a pair of electrode terminals for flowing a current through the free magnetic layer, the nonmagnetic layer, the pinned magnetic layer and the antiferromagnetic layer;

wherein a composition ratio of the CoFe sublayer is 95 to 85 wt % of Co and 5 to 15 wt % of Fe.

9. A spin valve magnetoresistive effect magnetic head according to claim 8, wherein a composition ratio of the CoFe sublayer is 90 wt % of Co and 10 wt % of Fe.

10. A spin valve magnetoresistive effect magnetic head according to claim 8, wherein a film thickness of the CoFe sublayer is in a range of 10 to 100 Å.

11. A spin valve magnetoresistive effect magnetic head according to claim 8, wherein the NiFe based alloy sublayer is made of NiFeCr, NiFeNb, or NiFeRh.

12. A spin valve magnetoresistive effect magnetic head according to claim 8, wherein a film thickness of the NiFe based alloy sublayer is in a range of 10 to 100 Å.

13. A spin valve magnetoresistive effect magnetic head according to claim 8, wherein the pinned magnetic layer is formed of CoFe.

14. A spin valve magnetoresistive effect magnetic head according to claim 8, wherein the nonmagnetic layer is formed of Cu.

15. A spin valve magnetoresistive effect magnetic head according to claim 8, wherein the under layer is directly below the free magnetic layer.

16. A magnetic disk drive comprising a magnetic recording medium and a spin valve magnetoresistive effect magnetic head for writing in and reading out information in the magnetic recording medium, wherein the spin valve magnetoresistive effect magnetic head is comprised of:

a free magnetic layer consisting of two sublayers where one sublayer is a CoFe sublayer and the other sublayer is an NiFe sublayer or an NiFe based alloy sublayer;

an under layer made of tantalum beneath and in direct physical contact with the free magnetic layer, a nonmagnetic layer stacked on the CoFe sublayer;

a pinned magnetic layer stacked on the nonmagnetic layer;

an antiferromagnetic layer for fixing a magnetization direction of the pinned magnetic layer according to an exchange coupling between the pinned magnetic layer and the antiferromagnetic layer; and a pair of electrode terminals for flowing a current through the free magnetic layer, the nonmagnetic layer, the pinned magnetic layer and the antiferromagnetic layer;

wherein a composition ratio of the CoFe sublayer is 95 to 85 wt % of Co and 5 to 15 wt % of Fe.

17. A magnetic disk drive according to claim 16, wherein the under layer is directly below the free magnetic layer.

* * * * *